United States Patent
Chiappini et al.

(10) Patent No.: US 6,440,196 B1
(45) Date of Patent: Aug. 27, 2002

(54) METHOD FOR PURIFYING AND CONCENTRATING A GAS MIXTURE INTO A MINOR CONSTITUENT, METHOD FOR DETECTING THIS CONSTITUENT, AND INSTALLATION

(75) Inventors: Remo Chiappini, L'Haÿ les Roses; Jean-Pierre Fontaine, Bruyeres le Chatel; Michel Hamonet, Chevilly Larue; Michel Thouard, Paris, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/674,834
(22) PCT Filed: May 11, 1999
(86) PCT No.: PCT/FR99/01120
§ 371 (c)(1),
(2), (4) Date: Nov. 30, 2000
(87) PCT Pub. No.: WO99/58225
PCT Pub. Date: Nov. 18, 1999

(30) Foreign Application Priority Data

May 12, 1998 (FR) .............................................. 98 05961

(51) Int. Cl.$^7$ .......................... B01D 53/04; B01D 53/22
(52) U.S. Cl. ...................... 95/45; 95/47; 95/51; 95/52; 95/54; 95/90; 95/114; 95/127; 96/4; 96/122; 96/126; 96/130; 96/143
(58) Field of Search .......................... 95/45, 47, 51–54, 95/90, 114, 116, 127, 133, 148; 96/4, 8, 10, 122, 126–128, 130, 143, 146

(56) References Cited

U.S. PATENT DOCUMENTS 3,501,923 A * 3/1970 Lehmer .................... 95/127 X (List continued on next page.)

FOREIGN PATENT DOCUMENTS

GB          1 605 041       12/1981

*Primary Examiner*—Robert H. Spitzer
(74) *Attorney, Agent, or Firm*—Burns, Doane, Swecker & Mathis LLP

(57) ABSTRACT

A method for purifying a minority constituent and concentrating it in a majority constituent of a gas mixture that also contains one or more other minority constituent(s) employs (i) a selective permeation step, (ii) next, a purification step, and (iii) finally a concentration step. In the selective permeation step, an initial gas mixture is passed through a membrane to yield a gas mixture that is enriched in the first minority constituent. In the purifying step, the first minority constituent is absorbed by a solid adsorbent which has a strong affinity for the first minority constituent, then following an elution step, a gas mixture that contains essentially only the majority constituent and the first minority constituent is formed. Finally, in the concentrating step, one or more successive adsorption and elution operations on a solid adsorbent, which has a strong specific affinity for the first minority constituent, are employed until an end gas mixture having the desired concentration of the majority constituent and the first minority constituent is obtained. This end gas mixture is highly enriched in the first minority constituent relative to the initial gas mixture. The procedure is particularly suited for detecting rare gases, e.g., xenon, and especially for detecting the natural and radioactive species in the atmosphere. The procedure can be employed in association with nuclear spectrometry to detect and monitor the presence of trace gases in the environment around nuclear installations.

21 Claims, 1 Drawing Sheet

U.S. PATENT DOCUMENTS

| | | | |
|---|---|---|---|
| 4,054,427 A | * 10/1977 | Schroeter et al. | 95/127 X |
| 4,092,133 A | * 5/1978 | Kamiya et al. | 95/127 X |
| 4,293,316 A | 10/1981 | Block | |
| 4,645,516 A | * 2/1987 | Doshi | 95/51 |
| 4,701,187 A | 10/1987 | Choe et al. | |
| 4,817,392 A | * 4/1989 | Agrawal et al. | 95/54 X |
| 4,863,492 A | 9/1989 | Doshi et al. | |
| 4,934,148 A | * 6/1990 | Prasad et al. | 95/52 X |
| 5,004,482 A | * 4/1991 | Haas et al. | 95/52 |
| 5,186,007 A | * 2/1993 | Takano et al. | 95/127 X |
| 5,207,806 A | * 5/1993 | Lagree et al. | 95/47 X |
| 5,354,547 A | * 10/1994 | Rao et al. | 95/45 X |
| 5,435,836 A | * 7/1995 | Anand et al. | 95/45 |
| 5,632,803 A | 5/1997 | Stoner et al. | |
| 5,669,959 A | * 9/1997 | Doshi et al. | 95/90 X |
| 5,906,673 A | * 5/1999 | Reinhold, III et al. | 95/45 |
| 6,179,900 B1 | * 1/2001 | Behling et al. | 95/45 |

\* cited by examiner

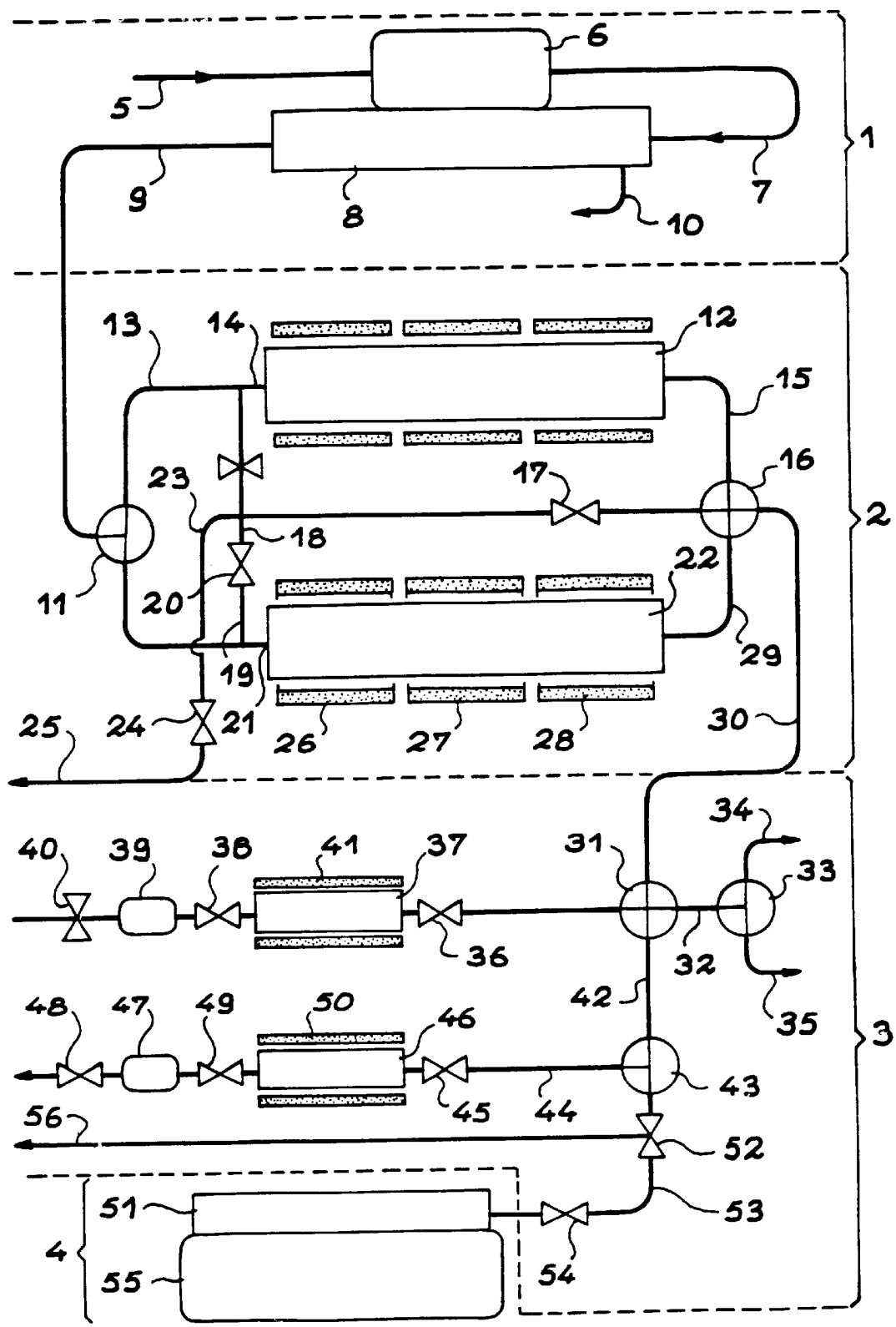

METHOD FOR PURIFYING AND CONCENTRATING A GAS MIXTURE INTO A MINOR CONSTITUENT, METHOD FOR DETECTING THIS CONSTITUENT, AND INSTALLATION

This application is a national phase of PCT/FR99/01120 which was filed on May 11, 1999, and was not published in English.

DESCRIPTION

The present invention relates to a method for purifying and concentrating a gas mixture into a minority constituent, to a method for detecting this constituent and to an installation for the application of this method.

More precisely, the invention concerns a method for purifying a first minority constituent and concentrating the latter into the majority constituent of a gas mixture containing, in addition to said first minority constituent and said majority constituent, one or more other minority constituents, in order to obtain an end gas mixture highly enriched in said first minority constituent relative to the initial gas mixture.

The treated gas mixture is in particular atmospheric air of which it is desired to concentrate some of the rare gases, in particular Xenon and especially the natural and radioactive species of Xenon.

The invention associated with nuclear spectrometry therefore finds application in the detection of these species, little abundant in the atmosphere, and in monitoring the environment of nuclear installations.

The literature cites different in situ methods for extracting minority constituents from a gas mixture, for example rare gases and especially Xenon from air, for the purposes of detection in particular.

The first method envisaged was the distillation of liquefied air, as described in the document by Y. V. Bubasov, Y. S. Popov, "Technical means of radioactive inert gas monitoring for detection of underground nuclear explosions", Khiopin Radium Institute, St. Petersburg, Russia.

Said method requires large-scale installations and considerable energy consumption to bring the air to its point of liquefaction.

A method was subsequently put forward which uses physical adsorption on solid substrates at very low temperature, as described in the document by I. Vintersved, L. E. De Geer, "Swedish experience of radionuclide monitoring", IAEA meeting in Helsinki Dec. 10–12, 1996 on Long Range Wide Area Environmental Monitoring, and in the document by T. W. Bowyer, K. H. Abel, "Automatic Radioxenon Analyzer for CTBT Monitoring", report PNNL-11 424, UC-713, November 1996, prepared for the U.S. DOE.

This method consists of fixing, one by one, the different minority constituents of air, at low and very low temperature, on specific solid substrates such as zeolite, activated carbon, silica gel. In this manner successive removal is made of water vapour, carbon dioxide then Radon and finally the Xenon is trapped.

This method has the disadvantage of operating at temperatures generally in the vicinity of $-110°$ C. requiring the application-of cryogenic techniques which go hand in hand with complex installations and high energy consumption.

Also, the functioning of the system is frequently disturbed by the formation of blockages due to freezing of the water in one of the adsorbents.

This method operates using a series of adsorbents of which each one is dedicated to the adsorption of one of the initial air constituents.

It is therefore necessary to have recourse to a considerable number of substrates or adsorbents, and moreover, since each adsorption stage is applied to all or almost all of the initial volume of air, and since the volumes of minority gases removed such as carbon dioxide and water are very high, the volume of the adsorption substrates is also high.

The considerable volume of the adsorption substrates requires an installation of proportional volume and leads to difficulties during the regeneration of these voluminous substrates by heating and passing an elution gas, which require long time periods, considerable energy consumption and substantial quantities of eluting agent.

A need therefore exists for a method of separating the constituents of a gas mixture which uses a limited number of steps, adsorption steps in particular, which may be applied under a reduced volume, which operates at a temperature close to ambient temperature without having recourse to a large-scale, energy-consuming cryogenic system, which is simple to implement and which allows substantial volumes of gas to be treated.

The purpose of the invention is to provide a method which, among others, meets these needs and which does not have the disadvantages, limitations, defects and drawbacks of the methods of the prior art and which solves the problems raised by the methods of the prior art.

This purpose, and others, are achieved according to the invention by a method for purifying a first minority constituent and concentrating the latter in the majority constituent of a gas mixture which, in addition to this first minority constituent and said majority constituent, contains one or more other minority constituents, said method comprising the succession of following steps:

Selective permeation of said initial gas mixture through a selective permeation membrane specific to the treated gas mixture, after which a gas mixture is obtained which is enriched in said first minority constituent and much depleted or scarcely enriched in said other minority constituent(s), Purifying said gas mixture enriched in said first minority constituent, derived from the first step, by adsorption at ambient temperature on a solid absorbent, followed by elution, after which a gas mixture is obtained that is essentially made up of said majority constituent and said first minority constituent and from which the other minority constituent(s) have been removed, Concentrating said first minority constituent in the majority constituent derived from step two by successive adsorption(s) and elution(s) on a solid adsorbent until an end gas mixture is obtained essentially made up of said majority constituent and said first minority constituent, highly enriched in said first minority constituent relative to the initial gas mixture, and having the desired concentration of said first minority constituent.

The invention therefore consists of the association, combination, or coupling of two gas separating techniques, firstly selective permeation through the wall, especially polymer wall, of a membrane specific to the treated gas mixture, and secondly adsorption of the gases on a solid substrate.

The coupling, according to the invention, is neither described, nor suggested in the prior art, or else for similar purposes the described methods use only a single separation technique, namely either distillation, of liquefied air for example, or adsorption, on several specific adsorbents.

Through the method of the invention, and through the coupling of the two techniques used by the method, it is no longer necessary to have recourse to liquefaction of the gas mixture such as air, and the cost of a large-scale cryogenic system is therefore avoided.

The selective permeation membrane continuously and without regeneration produces a gas mixture enriched in the desired minority constituent and much depleted in other minority constituent(s).

On this account, the number of solid adsorbents used in the following steps, purification and concentration according to the invention, is much reduced compared with the considerable number of adsorbents required in the second method of the prior art in which each of the different minority constituents of the gas mixture is fixed one by one, each time on a specific substrate.

In other words, with the membrane it is possible to overcome the need for the series of adsorbents used in the methods of the prior art which are intended to trap all the gases whose freezing points are higher than that of the desired gas such as Xenon in the case of air.

The volume of the substrates used for adsorption in the purification and concentration steps also comes to be considerably reduced, which facilitates their regeneration and reduces energy consumption during desorption, generally conducted by heating, as well as the volumes of gas used for elution.

Moreover, the volume of constituents to be fixed by adsorption, due to the prior membrane step, is greatly reduced compared with the prior art.

Subsequently, the adsorption operations are, according to the invention, generally conducted at ambient temperature without it being necessary, as in the prior art, to use cryogenic techniques to lower the temperature of the gas mixture; the result is a considerable energy savings. Since operations are conducted at non-cryogenic temperature, this also avoids the formation of solid water blockages within the installation.

Finally, preferably, the invention is self-sufficient in elution gas since it advantageously reuses, without storage, the majority constituent of the gas mixture, such as nitrogen, purified during the adsorption operations to elute the first minority constituent.

It therefore arises from the foregoing that the method of the invention, due in particular to the use of the permeation membrane, to the reduced number of adsorbents and their concurrent small volume, and to the absence of cryogenics, forms a simple, robust, low-cost method for purifying and concentrating a gas mixture into a minority constituent.

The method of the invention may be applied to any gas mixture for which there exists or may exist a membrane specific to the majority constituent; likewise with the method of the invention it is possible to concentrate the mixture into a first minority constituent irrespective of the nature and initial (minority) concentration of said first minority constituent, and irrespective also of the nature of the other minority constituent(s) and of their concentration (s) in the initial mixture.

Therefore the gas mixture may be a gas mixture whose majority constituent is chosen for example from among nitrogen, hydrogen, oxygen, gas hydrocarbons such as methane, carbon dioxide, etc . . .

By majority constituent is generally meant the constituent whose content, expressed as a percentage by volume in the initial gas mixture, is the highest and in general this content is greater than 50% by volume.

The gas mixture which is treated with the method of the invention is preferably air. Said first minority constituent in which it is desired to concentrate the mixture may also be chosen for example from among nitrogen, hydrogen, oxygen, a gaseous hydrocarbon such as methane, carbon dioxide.

Said first minority constituent may also be chosen from among the rare gases: Helium, Neon, Argon, Krypton, Xenon, and Radon.

Preferably said first minority constituent is Xenon, in particular when said initial gas mixture is air.

Said first minority constituent may also be found in any isotopic composition, that is to say in the form of any of its isotopes whether radioactive or not, or as a mixture of two or more of the latter.

In respect of Xenon, therefore, the latter may be in the form of one of its natural, stable, non-radioactive isotopes: $^{124}Xe$, $^{126}Xe$, $^{128}Xe$, $^{129}Xe$, $^{130}Xe$, $^{131}Xe$, $^{132}Xe$, $^{134}Xe$, $^{136}Xe$ or of one of its artificial radioactive isotopes: $^{135}Xe$, $^{133}Xe$, $^{131m}Xe$, $^{133m}Xe$, or a mixture of two or more of these isotopes.

Generally, Xenon is in the form of natural Xenon (formed of the mixture of its natural isotopes) mixed with one or more of its artificial isotopes such as $^{135}Xe$ $^{133}Xe$ $^{131m}Xe$ $^{133m}Xe$.

The other minority constituents of the gas mixture are easily deducted from the foregoing, for air these constituents are therefore oxygen, carbon dioxide, water vapour, other rare gases, impurities and other pollutants likely to be found in the treated air.

The concentration of said first minority constituent may vary within extensive limits, it may range from $10^{-6}\%$ to 50% by volume, for example up to 10% by volume, therefore in respect of Xenon contained in air this concentration is generally 87 ppb, namely $0.87.10^{-7}$ $cm^3$ $Xe/cm^3$ air, and with the method of the invention it is possible for example to produce 5 $cm^3$ Xe in 20 $cm^3$ nitrogen, i.e. an Xe enrichment by a factor of 2.106.

The membrane specific to the treated gas mixture used in the first step or selective permeation step is generally an artificial membrane in polymer fibre.

Such membranes are known to persons skilled in the art and are commercially available, and for air an industrial membrane device could be used known as a pure nitrogen generator.

Other membranes specific to other gas mixtures enabling enrichment in other minority constituents are also available.

After the first step of the method of the invention, the gas mixture is "enriched" in said first minority constituent, that is to say that the concentration by volume of the first minority constituent in this mixture is greater than its concentration in the initial gas mixture.

For example, this concentration is multiplied by a factor ranging from 2 to 20, preferably from 9 to 10, as is the case for Xenon when air is treated.

The gas mixture derived from the first step of the method of the invention is moreover much depleted in said other minority constituent(s), which generally indicates that the concentration of this or these minority constituents in the gas mixture derived from the first step of the method is lower or much lower than their concentration in the initial gas mixture, for example by a factor of 2 to $10^3$, this or these minority constituent(s) are therefore in "trace" form in the gas mixture derived from the first step, or have even been fully removed.

According to the invention, and in order to obtain optimal enrichment in the first minority constituent and strong depletion of the other minority constituent(s), it is necessary to act on the experimental conditions under which permeation is conducted, preferably adjustment is made to the flow of gas mixture passing through and leaving the membrane and/or to the set pressure upstream from the membrane.

For air, if it is desired to obtain high Xe enrichment, it is preferable to operate under "slow flow" conditions and under pressure.

By slow flow is meant that the flow of eluate leaving the permeation system only represents a small portion of the incoming flow of initial gas mixture, namely from 1/100 to 1/50 for example.

For air, pressure is generally between 5 and 10 bars.

During the purification step, according to the method of the invention, a specific adsorbent is generally chosen having sufficiently strong affinity for said first minority constituent, so that the adsorption of this first minority constituent is performed with a high yield, greater than 99% for example on a reduced volume of adsorbent and, according to the invention, at ambient temperature.

The nature of the solid adsorbent used in this step is essentially related to the first minority constituent.

If the first constituent is Xenon (treatment of air) it was found that activated carbon, for example Merck® activated carbon having a specific surface area of 1000 $m^2/g$, is particularly suitable as solid adsorbent for the purification step.

Other solid adsorbents specifically concerning the adsorption of other "first minority constituents" are in particular a molecular sieve (zeolite), alumina, silica gel.

For a flow of eluate determined by the membrane, the geometry of the retention column is adapted so that a compromise is found between a long trap of large storage capacity, but difficult to desorb causing high load loss, and a short trap of small capacity but which is easy to desorb.

Therefore, in the case of air and Xenon, slow flow operating conditions are maintained, equivalent to the slow flow defined above which leaves the permeation system under pressure, that is to say at the pressure defined above for the first step.

According to the invention, the elution conditions, in particular flow of elution gas, and/or elution temperature, and/or pressure, and/or elution time, are chosen so as to allow separation of the first minority constituent in the gas mixture from the other minority constituent(s) of the gas mixture, that is to say the elution of said first minority constituent from the gas mixture, independently from the other minority constituent( )s of the gas mixture, in order to obtain a gas mixture essentially made up of said majority constituent and said first minority constituent.

For example, for the treatment of air and its enrichment in Xenon, it was found that at a temperature of 250° C. and over, under slow flow operating conditions and under pressure, xenon was preferably eluted.

Advantageously, according to the invention, the purification step comprises at least two adsorption systems or devices lined with solid adsorbent, one of these devices being in adsorption phase while the other is in desorption phase, the elution gas used for desorption being formed of the purified majority constituent derived directly from the device in adsorption phase and without any intermediate storage.

It is one of the additional advantages of the invention that it is possible to do away with the need for the outside supply and voluminous storage of elution gas.

During the concentration step, the gas mixture derived from the second purification step is concentrated into said first minority constituent by successive adsorption(s) and elution(s) on a solid adsorbent.

Concentration is conducted by multiplying the adsorption-desorption steps, and by reducing each time the mass of adsorbent used and the volume of eluting gas.

The adsorbent used in this step is a specific adsorbent which again has a high affinity for the first minority constituent and is generally different from the adsorbent for the purification step.

This adsorbent is, for Xenon for example, an activated carbon known as Carboxene® 1003, other adsorbents used in this concentration step are for example other activated carbons such as Carbosieve® SIII.

The number of adsorptions conducted in this concentration step is related to the final concentration of first minority constituent which it is desired to obtain in the end gas mixture.

This number of adsorptions may range from 1 to 4.

By high enrichment is meant that the concentration expressed in % by volume of the first minority constituent in the end gas mixture is increased by a factor of $10^{+4}$ to $10^{+6}$ relative to the concentration in the initial gas mixture.

The invention also relates to a method for detecting and/or measuring a first minority constituent of a gas mixture in which purification is made, and concentrating the gas mixture in this first minority constituent using the above-described method, then the detection and/or measurement of this first minority constituent in the end gas mixture is carried out after the concentration step.

Detection and/or measurement may be conducted using any adequate detection and/or measurement method, mass spectrometry for example or gamma spectrometry.

This detection and/or measurement method applies in particular to the detection and/or measurement of radioactive species; for example, if the treated gas is air, such species are in particular radioactive species of Xenon: $^{135}Xe$, $^{133}Xe$, $^{131m}Xe$, $^{133m}Xe$ and mixtures thereof; that is to say that said minority constituent is partly formed of radioactive species of Xenon.

Detection and/or measurement is performed by gamma spectrometry. It is absolutely impossible to detect and/or measure Xenon species, which are scarcely abundant in the atmosphere, directly by spectrometry if detection and/or measurement is made directly on atmospheric air. This detection is solely possible by Xe concentration using the method of the invention.

The detection method of the invention therefore finds particular application in the monitoring of the environment in general, and the environment of nuclear installations in particular such as nuclear plants, treatment units, and any other source of radioactive species.

The method of the invention may also be used to permit the measurement of radio-isotope concentration ratios of one same element. Such element is in particular Xenon.

The method therefore finds application in the discrimination between the different emission sources of radio-isotopes such as radio-xenons.

Therefore, a high $^{135}Xe/^{133}Xe$ ratio is characteristic of a nuclear explosion, while a low $^{135}Xe/^{133}Xe$ ratio is rather more characteristic of a nuclear plant.

Finally, the invention concerns an installation to implement the method of the invention. Such installation essentially comprises:

means for the selective permeation of a gas mixture containing a first minority constituent, a majority constituent, and one or more other minority constituent (s), said permeation means comprising at least one membrane specific to the treated gas mixture and enabling a gas mixture to be obtained that is enriched in said first minority constituent and largely depleted or only slightly enriched in said other minority constituent(s);

means for purifying said gas mixture enriched in said first minority constituent derived from said permeation means, said purification means comprising at least one adsorption device such as a column lined with a solid adsorbent and means to elute said device, enabling a gas mixture to be obtained essentially made up of said majority constituent and said first minority constituent and from which the other minority constituent(s) has or have been removed;

means for concentrating said first minority constituent in the majority constituent derived from said purification means, said concentration means comprising a sufficient number of adsorption devices such as columns, lined with solid adsorbent, and means for eluting said devices in order to obtain an end gas mixture essentially made up of said majority constituent and said first minority constituent, highly enriched in said first minority constituent relative to the initial gas mixture and having the desired concentration of said first minority constituent.

The invention shall be described below in more detail in the following description given for non-restrictive, illustrative purposes with reference to the appended drawing in which FIG. 1 is a functional diagram of an installation for the implementation of the method of the invention.

FIG. 1 illustrates the implementation of the method of the invention in the particular case of air, but evidently, as mentioned above, the method of the invention may be applied to any gas mixture optionally after adaptation of any one of its steps to the specific gas mixture to be treated.

Such adaptations or modifications come within the scope of normal operations of persons skilled in the art.

The method of the invention, as described in FIG. 1, generally comprises four essential steps which, for convenience, have been called collection (step 1), purification (step 2), concentration (step 3) and optionally measurement and/or detection (step 4).

In the first so-called collection step 1, air is collected at 5, this air is generally ambient air, that is to say its composition, particularly in respect of Radon, may vary in relation to the geological nature of the land in whose vicinity the air is collected, depending upon whether the land is sedimentary or granite for example.

The volume of air collected is variable, and may range from 350 to 500 m³ for example over a period of 24 h.

The air then passes into a device intended to raise its pressure, such as a compressor 6, in which it is compressed generally at a pressure of 5 to 10 bars, and preferably 9 bars.

The pressurized air is then added as an injectate 7 into a permeation device with one or more membranes 8 in which selective permeation of the gases is performed through the polymer wall of a membrane specific to the gas mixture, in this case air.

The membrane used is derived from an industrial device known as a pure nitrogen generator.

It is a bundle of hollow fibres made of an organic polymer whose walls are coated with a thin film which ensures gas division.

The physico-chemical characteristics of this type of membrane make possible the continuous production, without regeneration, of nitrogen much depleted in oxygen, water vapour and carbon dioxide in particular, or even rid of these minority constituents.

As an example, the eluate derived from the membrane device only contains approximately 200 ppm of oxygen and 5 ppm of water vapour and less than approximately 10 ppm of carbon dioxide.

This depletion is accompanied by a high enrichment in xenon, for example by a factor of 9 to 10, that is to say that the concentration of Xenon, which in ambient air is generally in the region of 87 ppb, increases to approximately 780 to 870 ppb, for example to 800 ppb.

A certain enrichment in Krypton (Kr) and Radon (Rn) is also observed which as a general rule, in particular for Krypton, is by a factor of 2 to 3 relative to the initial gas mixture.

In order to obtain a high Xenon enrichment, it was found that it is preferable to operate at a relatively slow flow rate: namely from 200 to 300 l/h, for example 220 l/h for the flow of eluted nitrogen.

The temperature at which permeation is conducted generally ranges from 40 to 70° C., for example 58° C.

The treatment of the injectate in the membrane device, in addition to the eluate described above, gives a permeate 10 essentially made up of nitrogen and the minority constituents of which the air has been depleted: oxygen, carbon dioxide, water vapour. On account of the slow eluate flow preferably used, approximately 98 to 99% of the initial injectate flow is found in the permeate.

By way of example, for an injectate flow of 18 m³/h under 9 bars, the permeate flow is 17.78 m³/h, while the eluate flow 9 is 0.22 m³/h.

It is this eluate 9 which, still under pressure (5 to 10 bars) is sent to the second step of the method of the invention called the purification step 2.

The eluate passes firstly through a three-way gate 11 which directs it either towards column 12, or towards column 22.

The eluate is for example directed towards column 12 via pipes 13, 14.

This column 12 is filled with a solid adsorbent which generally has a strong affinity for Xenon, so that it is possible to carry out adsorption at ambient temperature, that is to say at 20° C. for example, without the need for cryogenics.

By way of example of solid adsorbent that is particularly suitable for fixing Xenon, activated carbon may be mentioned such as that marketed by Merck.

The pressure used is the same as in the membrane permeation step, and is therefore generally from 5 to 10 bars, preferably 9 bars.

The flow rate is also preferably a slow flow rate, corresponding to the eluate flow 9 on leaving the membrane device, which is generally from 200 to 300 l/h, for example 220 l/h.

The period of the adsorption operation is generally from 1 to 5 hours, for example 3 hours.

Under these conditions, it is possible to obtain entrapping of the Xenon with a high yield, for example greater than 99%, even 99.99%.

At the same time as the Xenon, the last impurities still contained in the nitrogen/xenon mixture are trapped on column 12 (oxygen, carbon dioxide, water vapour, krypton, argon, radon, etc).

The gas leaving column 12 is essentially pure nitrogen which, via piping 15, is directed from 4-way gate 16, from gate 17, then from pipes 18, 19, 21 and gate 20 towards the second adsorption column 22 filled with a solid adsorbent identical to that of the first column 12.

Two columns are shown in FIG. 1, but the installation may evidently comprise a greater number.

Column 22 was loaded, essentially with Radon and Xenon, under the same conditions as column 12 within the preceding time period, for example 3 hours.

While column 12 is in adsorption phase, the gases retained in the solid adsorbent of column 22 are eluted under the action of the flow of nitrogen from pipe 21.

The flow of pure nitrogen for the elution of Xenon is generally a slow flow, therefore if the incoming and outgoing flow of gas in and out of column 12 is 220 l/h, the flow of pure nitrogen used for elution in column 22 only represents a fraction of the incoming flow and is approximately 30 l/h, while the remainder of the nitrogen, i.e. 190 l/h for example, is evacuated via pipes 23 and 25 fitted with gate 24. The pressure is identical to that indicated above, that is to say 5 to 10 bars, preferably 9 bars.

To conduct desorption and elution, the solid adsorbent of column 22 is heated by means of a series of ovens, preferably tubular ovens 26, 27, 28 each surrounding a section of column 22.

Firstly, the adsorbent generally undergoes a gradual rise in temperature from ambient temperature up to a temperature generally in the region of 250° C., after which elution of the compounds other than Xenon and Radon is made which have remained trapped on the solid adsorbent and which are more weakly adsorbed than Xe and Rn (water vapour, carbon dioxide, oxygen . . . ); the nitrogen containing these impurities is evacuated via pipe 29, pipes 30, 32, 3-way gate 33 and finally by pipes 34 and 35.

When the temperature of 250° C. is reached, a temperature plateau is generally observed according to the invention for a period of varying duration, for example of 20 minutes or more to desorb, and specifically elute the Xenon.

The elution of Xenon therefore takes place at a temperature of 250° C. for example, under pressure, of 9 bars for example, under a slow flow of pure nitrogen (eluting gas), for example of 30 l/h, and for a period of 30 minutes for example per column section, i.e. 1 hour 30 minutes for the entire column 22.

Once the entirety of the adsorbed Xenon on column 22 has been desorbed, the Radon it contains, or more generally all the possible impurities more strongly adsorbed than Xenon on the adsorbent of column 22, can be removed. For this purpose, it is no longer part (for example 30 l/h) but all, that is to say 220 l/h, of the pure nitrogen flow derived from column 12 that is directed towards column 22 (the two-way gate 24 being closed in this case).

Temperature and pressure remaining unchanged, and under the sweeping effect of this strong flow, the Radon is carried away by the pure nitrogen; the Radon-containing nitrogen is evacuated by pipes 29, 30, 32, 34, 35 and gates 16, 31 and 33 (or entrapped for the purposes of optional subsequent measurement).

After removal of the Radon, column 22 is cooled down to ambient temperature and may be loaded once again.

By actuating gate 11 in particular, columns 12 and 22 are alternately subjected to loading operations (adsorption) and elution operations (desorption), one of the columns being under load while the other is eluted and vice versa.

The gas mixture derived from the purification step is then sent to the following step called the concentration step 3.

This gas mixture is, in consequence, essentially made up of Xenon and nitrogen, and may possibly and exceptionally contain traces of Radon if the treated air is rich in Radon.

Since the elution of the trapped Xenon in columns 12 and 22 is conducted with a low volume of nitrogen relative to the incoming volume (for example 30 l/h instead of 220 l/h), the Xenon is already concentrated in relation to the initial gas and to the gas added during the purification step; for example, this gas has a Xenon concentration close to 400 times the Xenon concentration in ambient air.

During the concentration step 3, the above-described gas mixture of nitrogen and Xenon is, via 4-way gate 31 and gate 36, directed towards an adsorption column 37 containing an adsorbent specific to Xenon, namely Carboxene® 1003 for example, an activated carbon.

Adsorption is generally performed under a pressure of 5 to 10 bars, preferably 9 bars, and at ambient temperature, for a period of 10 to 20 minutes, the gas mixture flow is slow, for example from 10 to 50 l/h, and the quantity of adsorbent contained in column 37 is notably less than that contained in each of columns 12 and 22, for example whereas each of columns 12 and 22 contains approximately 340 grams of activated carbon, column 37 only contains 2.6 grams of Carboxene.

When the adsorption of Xenon is completed, column 37 is isolated by gate 38, and a certain volume of pure nitrogen is stored in reservoir 39 fitted with gate 40.

For desorption, elution of the Xenon entrapped on column 37, gate 38 is opened and the pure nitrogen contained in reservoir 39 is sent into column 37.

Elution generally takes place under a pressure of 1 bar, with a slow nitrogen flow, for example of 2 l/h, for a very short period, 1 minute for example, and at a temperature greater than 250° C., for example 300° C., heating of the adsorbent being achieved by means of oven 41, preferably of tubular type.

Owing to the small volume of nitrogen used for elution, which is for example 10 times less than that used for adsorption, the gas mixture derived from column 37 and evacuated via gate 36 is already highly enriched in Xenon, that is to say it contains 1 to 2% by volume of Xenon, for example 1.7% by volume.

This gas is sent into a second adsorption column 46 for the concentration step, via 4-way gate 31, 3-way gate 43, pipes 42 and 44 and 2-way gate 45.

Column 46 generally contains the same type of adsorbent as column 37, namely Carboxene 1003 but in lesser quantity, for example if column 37 contains 2.6 grams of adsorbent, column 46 will only contain approximately 1 g.

Adsorption on column 46 is generally conducted under the same conditions as adsorption on column 37.

In similar manner, at the end of adsorption a certain volume of pure nitrogen is entrapped in reservoir 47, isolated by two-way gates 48 and 49.

An installation is described in FIG. 1 comprising two columns in the concentration step, but evidently depending upon the desired enrichment, that is to say according to the desired Xenon concentration in the end gas mixture, the number of solid adsorbents and successive adsorption and elution operations in concentration step 3 may be greater, being as many as 4 for example.

After repeating eight times the above-described sequence, that is to say after having conducted eight adsorptions on adsorbent 46 without ever eluting the latter, the elution is finally conducted of the Xenon contained in the last adsorption column of the concentration step (in this case column 46), heating being ensured by oven 50, generally a tubular oven.

In general, elution starts by setting up a vacuum by means of gate 52 and vacuuming pipe 56, then "flash" elution is performed by rinsing under 1 bar at 300° C. with the pure nitrogen derived from reservoir 47.

The nitrogen, derived from column 46, is highly enriched in Xenon, as an example a mixture is obtained containing 4.5 cm$^3$ of Xenon in 20 cm$^3$ nitrogen.

This corresponds to what is termed in the invention as "high enrichment" or substantial enrichment in Xenon, since the Xenon content in the final nitrogen volume is for example, in the above case, approximately 2.106 times the Xenon content of air.

The nitrogen highly enriched in Xenon is subsequently, according to FIG. 1, directed towards an Xenor container 51 via gates 52 and 54 and pipe 53.

The Xenon container forms part of measuring step 4 with which the method of the invention is generally associated; the measuring step uses measuring equipment 55 which may be any suitable equipment, for example a gamma spectrometer, to detect the radioactive species of Xenon such as $^{135}$Xe, $^{133}$Xe, $^{131m}$Xe, $^{133m}$Xe which are present in the atmosphere.

The installation shown in FIG. 1 evidently also comprises a complete series of measuring and adjustment device such as thermocouples, pressure gauges, flowmeters, oxygen sensors, hygrometers, etc. which have not been shown in the figure for reasons of clarity.

EXAMPLE

This example is intended to illustrate the implementation of the method of the invention to obtain, from air, a gaseous mixture essentially containing nitrogen highly enriched in Xenon (Xe).

The installation used in this example is substantially similar to the one whose functional layout is described in FIG. 1.

45 m$^3$ of natural air, compressed under 9 bars, are added at the rate of 15 m$^3$/h to a gas permeation device (called a membrane) specific for the production of pure nitrogen from standard air.

The type of membrane used is. derived from a known industrial device called a pure nitrogen generator.

It is a bundle of hollow fibres made of an organic polymer whose walls are coated with a thin film which ensures gas division.

The physico-chemical properties of the membrane are such that the pure nitrogen produced (or eluted) is not only rid of oxygen (<200 ppm) water vapour (5 ppm) and carbon dioxide (<10 ppm) but is also 9 times richer in Xenon than ambient air (and probably more than 10 times richer in Radon than ambient air).

However, to obtain this enrichment, the flow of eluted nitrogen has to be reduced to 250 ln/h. By so doing, 98% of the compressed air is lost through the permeation channel.

For 3 hours, this mixture of nitrogen and Xenon (780 ppb) is insufflated at ambient temperature under 9 bars of pressure at the rate of 250 ln/h on 340 grams of activated carbon (Merck) which fills column 12. The affinity of Xenon for this adsorbent is sufficiently strong for its absorption to be obtained without having recourse to cryogenics, while maintaining a reasonable column length (1 m; diameter 3.2 cm). The yield of this entrapping step is higher than 99%.

At the same time, column 22, loaded under the same conditions for the three preceding hours, is eluted, drained of the radon it contains and cooled down to ambient temperature. The elution of Xenon takes place at 250° C. under 9 bars at the rate of 30 ln/h of nitrogen. This vector gas, free of Xenon, is recovered at the outlet of column 12. With these experimental conditions it is possible to conduct the chromatographic separation of Xenon and Radon, that is to say to elute the Xenon independently from the Radon. Elution is continued for 1 hour 30.

Over the last third of the time, the mixture of nitrogen and Xenon (0.005%) is adsorbed under 9 bars on 2.6 grams of a new adsorbent (Carboxene® 1003) contained in column 37. At the end of adsorption, at the time of isolating column 37, a volume of nitrogen is trapped under 9 bars in reservoir 39 of 200 cm$^3$.

Column 22 must now be cleared of the radon it contains. All the gas available at the exit of column 12 is therefore injected into column 22 for 15 minutes.

This operation is sufficient to remove the few becquerels of entrapped Radon.

1 hour 15 now remains to cool column 2 before starting a new adsorption cycle on this column. To evacuate the heat as quickly as possible, a fraction of the permeate (1 to 2 m$^3$/h) is pressed into ovens 26, 27, 28 surrounding column 22.

Within 10 minutes after clearing the Radon, the Xenon trapped on column 37 is desorbed. Elution takes place at 300° C. under 1 bar at the rate of 2 ln/h nitrogen supplied by reservoir 39. During the last minute of the 10-minute period, the mixture of nitrogen and Xenon (1.7%) is adsorbed at ambient temperature under 1 bar of pressure, on 1 gram of Carboxene 1003 contained in column 46. Only 33 cm$^3$ nitrogen is needed to terminate elution. At the end of adsorption, when isolating column 46, a volume of nitrogen is trapped under 1 bar in reservoir 47. Throughout the next hour the thermostatically controlled enclosure enclosing column 37 is no longer supplied and cools naturally down to ambient temperature.

This completes the first of the 8 3-hour cycles after which column 46 contains 4.5 cm$^3$ of Xenon. It is then desorbed at 300° C. and depressurized in the counting cell; the contents of reservoir 47 are depressurized in the latter. On completion, this method has made it possible, within a 24-hour operating period, to produce 4.5 cm$^3$ Xenon in 20 cm$^3$ nitrogen. A substantial enrichment is therefore obtained. The Xenon content of the final nitrogen volume is approximately $2 \times 10^{+6}$ times that of Xenon in air.

What is claimed is:

1. Method for purifying a first minority constituent and concentrating the latter in the majority constituent of a gas mixture containing, in addition to said first minority constituent and said majority constituent, one or more other minority constituent(s), said method comprising the succession of following steps:

Selective permeation of an initial gas mixture to be treated through a membrane specific to the initial gas mixture, after which a gas mixture is obtained enriched in said first minority constituent and much depleted or only slightly enriched in said other minority constituent(s);

Purifying said gas mixture enriched in said first minority constituent derived from the first step, by adsorption at ambient temperature on a solid adsorbent which is a specific adsorbent having a strong affinity for the first minority constituent, then elution, after which a gas mixture is obtained essentially made up of said majority constituent and said first minority constituent, and from which the other minority constituent(s) have been removed, Concentrating said first minority constituent in the majority constituent derived from the second step, by one or more successive adsorption and elution operations on a solid adsorbent which is a specific adsorbent having a strong affinity for the first minority constituent, until an end gas mixture is obtained essentially made up of said majority constituent and said first minority constituent, highly enriched in said first minority constituent relative to said initial gas mixture, and having the desired concentration of said first minority constituent.

2. Method according to claim 1, in which the initial gas mixture is a gas mixture whose majority constituent is chosen from among nitrogen, hydrogen, oxygen, gaseous hydrocarbons, carbon dioxide.

3. Method according to claim 2, in which said gas mixture is air.

4. Method according to claim 1, in which said first minority constituent is selected from the group of rare gases consisting of helium, neon, argon, krypton, xenon and radon.

5. Method according to claim 1, in which said first minority constituent is in the form of any one of its isotopes whether radioactive or not, or of a mixture of two or more thereof.

6. Method according to claim 5, in which said first minority constituent is natural xenon in a mixture with one or more or if its radioactive isotopes that is selected from the group consisting of $^{131}$Xe, $^{135}$Xe, $^{131m}$Xe and $^{133m}$Xe.

7. Method according to claim 1, in which during the first step, in order to obtain a gas mixture enriched in said first minority constituent and much depleted in said other minority constituent(s), adjustment is made to the flow of gas mixture (eluate) leaving the permeation system and/or to the set pressure upstream from the membrane.

8. Method according to claim 1, in which during the purification step, the flow of elution gas, the elution temperature the pressure and/or the time of elution is chosen to enable, during elution, the separation of the first minority constituent of the gas mixture from the other minority constituent(s) of the gas mixture.

9. Method according to claim 1, in which the purification step comprises at least two adsorption systems or devices lined with solid adsorbent, one of these devices being in adsorption phase while the other is in desorption phase, the elution gas used being made up of the purified majority constituent directly derived from the adsorption phase device and without any intermediate storage.

10. Method according to claim 1, in which concentration is made by multiplying adsorption-desorption steps and by reducing each time the mass of adsorbent used and the volume of elution gas.

11. Method according to claim 1, in which the solid adsorbent used during the concentration step, which is a specific absorbent having a strong affinity for the first minority constituent, is different from the adsorbent used during the purification step.

12. Method according to claim 1, in which said gas mixture is air and said first minority constituent is xenon.

13. Method according to claim 12, in which the initial gas mixture is air and the selective permeation step comprises reducing the rate at which the gas mixture is obtained in order to increase the concentration of said first minority constituent in the gas mixture.

14. Method according to claim 12, in which the solid adsorbent of the purification step and/or concentration step is activated carbon.

15. Method according to claim 14, in which the solid adsorbent of the concentration step is activated carbon.

16. Method according to claim 12, in which the elution of xenon during the purification step is conducted at 250° C. and over observing a temperature plateau for a time of 20 minutes or more, under a slow flow of pure nitrogen, and under pressure.

17. Method for detecting and/or measuring a first minority constituent of a gas mixture in which purification is made, and concentration of the gas mixture into this first minority constituent using the method according to claim 1, then after the concentration step the detection and/or measurement of the first minority constituent is made in the end gas mixture.

18. Method according to claim 17, in which said minority constituent is made up in part of one or more radioactive species of xenon, and the gas mixture is air.

19. Method according to claim 18, in which the detection is made of the radioactive species of xenon by gamma spectrometry.

20. Method according to claim 18, in which the concentration ratios of the different radio-isotopes of xenon are measured in order to discriminate the sources of emission.

21. Installation for the implementation of the method according to claim 1, comprising:

means for the selective permeation of a gas mixture containing a first minority constituent, a majority constituent, and one or more other minority constituent(s), said permeation means comprising at least one membrane specific to the gas mixture and enabling a gas mixture to be obtained enriched in said first minority constituent and much depleted or only slightly enriched in said other minority constituent(s);

means for purifying said gas mixture, enriched in said first minority constituent, derived from said permeation means, said purification means comprising at least one adsorption device that comprises a column lined with a solid adsorbent, which is a specific adsorbent having a strong affinity for the first minority constituent, and means to elute said device to obtain a gas mixture essentially made up of said majority constituent and said first minority constituent, and from which the other minority constituent(s) have been removed;

means for concentrating said first minority constituent in the majority constituent derived from said means for purifying said gas mixture, said means for concentrating comprising a sufficient number of adsorption devices that comprise columns, lined with a solid adsorbent, which is a specific adsorbent having a strong affinity for the first minority constituent, and elution means for said devices, to obtain an end gas mixture essentially made up of said majority constituent and said first minority constituent, highly enriched in said first minority constituent relative to the initial gas mixture and having the desired concentration of said first minority constituent.

* * * * *